UNITED STATES PATENT OFFICE 2,513,351

PREPARATION OF GLUTEN PHOSPHATES

Harold S. Olcott and Ali Mohammad, Berkeley, Calif., assignors to the United States of America as represented by the Secretary of Agriculture No Drawing. Application September 9, 1949, Serial No. 114,899

11 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to gluten phosphates having gel-forming properties. One object of this invention is to provide methods for preparing gluten phosphates having gel-forming properties. Further objects will be obvious from the description herein.

One method for preparing gluten phosphates having gel-forming properties involves the reaction of gluten with a large excess of phosphoric acid containing phosphorus pentoxide, as disclosed in application bearing Serial No. 82,901, filed March 2, 1949, by Robert E. Ferrel and Harold S. Olcott. The necessity for using a large excess of the phosphating reagent makes the process expensive and also makes the isolation of the product difficult as the gluten phosphate must be separated from a large proportion of phosphating agent.

It has now been found that the proportion of phosphating agent to gluten can be drastically reduced if urea is used as an esterification adjuvant. Thereby substantial savings are made and the gluten phosphate can be prepared at a much lower cost than previously. Further, the product is more readily isolatable from the reaction mixture.

It has also been found that the gluten phosphates prepared in accordance with this invention possess greater gel-forming properties than the corresponding materials prepared by reaction of gluten with phosphoric acid containing excess phosphoric anhydride.

In accordance with this invention, the following technique is employed: The gluten is mixed with phosphoric acid and urea. This mixture is then subjected to an elevated temperature to carry out the esterification. Preferably the mixture is dried before being subjected to the elevated reaction temperature. By proceeding in this preferred manner, products of especially high gelling capacity are obtained.

The gluten which is used as the raw material in accordance with this invention, should preferably be in its native or undenatured state to obtain products of highest gel-forming capacity. The gluten may be employed in its wet pasty form as obtained by kneading in water or other known treatment of wheat flour to separate the gluten from the starch. Other suitable materials are the dry glutens, prepared for example by vacuum drying of the wet pasty wheat gluten. If desired, materials containing gluten may be used instead of gluten, itself. Thus wheat flour may be used directly in the process.

The amount of phosphoric acid required for the phosphatation reaction is only a small fraction of the weight of gluten. Generally, the proportion of phosphoric acid should be such as to supply about 0.1 to about 0.4 gram of $H_3PO_4$ per gram of gluten. The concentration of phosphoric acid, with respect to water, is not critical and generally the 85% phosphoric acid of commerce is used as a convenient source of this reactant. The proper proportion in using this reagent is about 0.075 to about 0.3 ml. per gram of gluten. Obviously, if a phosphoric acid of different concentration is used, the amount thereof should supply $H_3PO_4$ in the proportions shown above. In using 85% phosphoric acid, it is preferred to employ approximately 0.18 ml. (0.26 gram $H_3PO_4$) per gram of gluten, since this proportion gives a gluten phosphate of outstanding hydration capacity yet is economical with regard to amount of phosphating reagent.

The proportion of urea is not critical, generally about .2 gram urea per gram of gluten is sufficient to give excellent results. The proportion of urea can be increased as much as desired above this level without any significant additional effect on the reaction.

In carrying out the process the gluten, phosphoric acid and urea are first mixed together. When dry gluten is used it is generally advisable to add some water, as the dry reagents are not properly wetted by the phosphoric acid and thus a homogeneous mixture cannot be made. Only enough water need be added to insure proper wetting of the dry reactants; an excess of water will do no harm but will of course be more trouble to remove in subsequent steps. If the concentration of phosphoric acid used is considerably below 85%, sufficient water will be added in this reagent to obtain proper wetting and no additional water need be added.

When proceeding according to the preferred modification of this invention, the mixture of gluten, urea, and phosphoric acid (and water, if necessary) is then dried. This drying may be accomplished in a number of ways—by exposing to air at room temperature, by vacuum drying, by use of chemical desiccants, or by exposure to heated air, etc. In general it is preferred to dry the mixture in an oven which is equipped to provide a blast of air at about 40° C. over the mixture. Regardless of what drying technique is used, the temperature should not be above about 60° C., since temperatures above this limit tend to cause decomposition of the protein, thereby products of lower gelling power will be formed.

After the reaction mixture has been dried, or after the mixture has been prepared, if the drying step is not employed, the mixture is subjected to an elevated temperature to actually bring about the phosphation. In this heating step the temperature should be from about 130° to about 150° C., 140° C. being preferred. It has been observed that during this reaction period, in contrast to the drying step, the temperature can be raised to a substantially high level without causing decomposition. Vacuum can be applied to the material during the heating step whereby the rate of esterification is enhanced by removal of water formed in the reaction.

The steps of drying and reacting can be carried out continuously in suitable apparatus. For example, the wet reaction mass may be conveyed on an endless belt through a heating device containing two separate heating zones. In the first zone the wet reaction mass is dried at moderate temperatures while in the second zone the dry reaction mass is subjected to elevated temperature to enable the reaction to proceed. Another technique would be to introduce the wet reaction mixture into a suitable agitator—for instance, a rotating drum containing stainless-steel or ceramic balls to mix and grind the material. Warm air can then be introduced into the drum through a hollow shaft and the temperature of the air increased as the mass becomes dry until the temperature is raised to reacting temperature as the material becomes completely dry. The increase in temperature can also be effected by the use of electrical heating elements or steam jackets about the drum walls.

After the heating step is completed the reaction mass is usually neutralized with an alkaline reagent. This converts the gluten phosphate from its acid form into its salt form. Generally, sodium hydroxide is used for this purpose, although any other alkaline material may be used to prepare the sodium salt or salts of other cations. Thus one can also employ sodium carbonate, sodium bicarbonate, potassium hydroxide, potassium carbonate, potassium bicarbonate, ammonium hydroxide, carbonates of ammonia, calcium hydroxide and so forth. Obviously, one is here dealing with a simple neutralization reaction and any alkaline material can be used to produce any desired salt. The neutralization is of course, not limited to inorganic bases as salts with organic bases may be prepared. Thus one may neutralize with trimethyl amine, mono-, di-, or triethanol amine, morpholine, brucine, strychnine, pyridine, piperidine, aniline, glyceryl amine, tetraethyl ammonium hydroxide, dodecyl trimethyl ammonium hydroxide, triethyl sulphonium hydroxide, and so forth.

If a purified product is desired, the neutralized reaction mixture is washed with water to remove the non-colloidal materials present in the reaction mixture. After washing with water, the gluten phosphate may be washed with an organic solvent such as alcohol or acetone which displaces excess water and makes the product easier to dry. If desired, the reaction mixture may be washed with an aqueous solution of an ammonium salt of a weak, volatile acid, i. e., ammonium carbonate or ammonium bicarbonate. This procedure is desirable, as the presence of the ions in the water prevents undue swelling of the colloidal product during the washing treatment. After the washing is complete, the excess of ammonium salt is easily removed by subjecting the product to moderate heat whereby the ammonium salt is decomposed and vaporized off. The method of washing hydrophilic colloids in this manner is disclosed and claimed in the patent of W. D. Ramage, No. 2,474,367, issued June 28, 1949. Another technique for purifying the neutralized product involves washing it with an organic solvent such as ethanol, propanol, isopropanol, butanols, or acetone, using for the first washing a solvent diluted with water then washing it additionally with the solvent containing decreasing concentration of water. Thus for example, the salt may be first washed with acetone containing 50% water, then with acetone containing 30% water, then with acetone, itself. This technique is advantageous, as the salt does not swell unduly during the washing, hence separation of product from wash liquid is easier and more complete.

The following examples demonstrate the process of this invention using particular materials, steps, and conditions. It is understood that these examples are furnished only by way of illustration and not limitation.

In the following examples, the term "hydration capacity" is used to represent the ability of the material to hydrate or form a gel with water. The hydration capacity values designate the amount of gel formed when a unit amount of product is contacted with an excess of water. Thus a hydration capacity of 150 means that if one part of the product is contacted with an excess of water, it will form 150 parts of gel. Obviously, the higher the hydration capacity, the greater is the gelling ability and usefulness of the material.

*Example I*

Ten grams of dry, undenatured wheat gluten was mixed with 3 grams of urea, 1.82 ml. of 85% phosphoric acid and 10 ml. water and the mixture was dried in a forced draft oven at 40° C. then ground. The ground, dry mixture was then heated at 140° C. under vacuum for 30 minutes. The reaction mixture was ground, neutralized with sodium hydroxide solution and washed with water until the wash water no longer contained phosphate ions. The washed gluten phosphate was washed with acetone then dried under vacuum. The product was obtained in 35% yield, contained 1.27% phosphorus, and had a hydration capacity of 140–154.

*Example II*

The process as set forth in Example I was repeated several times employing varying proportions of phosphoric acid. The following results were obtained:

| Expt. No. | Amount of 85% phosphoric acid used, ml. | Phosphorus in product, per cent | Hydration capacity of product |
|---|---|---|---|
| 2 | 0.91 | 0.67 | 70 |
| 3 | 1.27 | 0.96 | 100 |
| 4 | 2.12 | 1.25 | 116 |
| 5 | 2.42 | 1.23 | 116 |
| 6 | 3.0 | 1.11 | 156 |

Example III 10 grams of wheat flour (containing 13.5% gluten) was mixed with 1.5 grams of urea, 1 ml. of 85% phosphoric acid, and 5 ml. of water. The mixture was dried in a forced draft oven at 40° C., ground, then heated in vacuum at 140° C. for 30 minutes. The reaction mixture was neutralized with sodium hydroxide, washed and dried. The gluten phosphate contained .67% phosphorus and formed a gel with water.

Example IV

Two grams of dry, undenatured wheat gluten, 0.6 gram of urea, and 1 ml. of 85% phosphoric acid were mixed and heated for 30 minutes at 140° C. The reaction mixture was neutralized with sodium hydroxide, washed, and dried.

Example V 10 grams of denatured wheat gluten, 1.82 ml. of 85% phosphoric acid, 3 grams of urea, and 10 ml. of water were mixed. The mixture was dried in a forced draft oven at 40° C., ground, then heated under vacuum at 140° C. for 30 minutes. The reaction mixture was neutralized with sodium hydroxide solution, washed and dried. The gluten phosphate had a hydration capacity of 70.

Example VI 30 grams of wet wheat gluten (67% moisture), obtained by water-kneading of wheat flour, was mixed with 3 grams of urea and 1.82 ml. of 85% phosphoric acid. The mixture was dried in a forced-draft oven at 40° C., ground and heated to 140° C. under vacuum for 30 minutes. The product was neutralized with sodium hydroxide solution, washed and dried. The gluten phosphate was obtained in a yield of 31% and had a hydration capacity of 240.

Example VII 10 grams of dry, undenatured wheat gluten, 3 grams urea, 1.82 ml. of 85% phosphoric acid, and 10 ml. water were mixed. The mixture was heated in an oven maintained at 140° C. for 30 minutes. The reaction mixture was neutralized with sodium hydroxide, washed, and dried. A yield of gluten phosphate of 41% was obtained, hydration capacity 80.

Example VIII

A sample of wet wheat gluten containing 15 grams of dry gluten was mixed with 4.6 grams of urea and 2.73 ml. of 85% phosphoric acid. The mixture was dried in a forced-draft oven at 40° C., then ground. The ground, dry mixture was then heated at 139° C. under vacuum for 30 minutes. The reaction mixture was neutralized with aqueous sodium hydroxide solution then washed successively with 50% acetone, 70% acetone, and acetone, itself. The washed sodium gluten phosphate was dried under vacuum—yield 31%, hydration capacity, 204, phosphorus content, 1.57%, nitrogen content, 15.4%.

The gluten phosphates produced in accordance with this invention, and their salts, particularly their ammonium and alkali metal salts, are white solids which are valuable, in that they possess the property of readily absorbing large quantities of water thereby forming colorless, odorless, nontoxic, and tasteless gels. The volume of such gel is often over one hundred times that of the gluten phosphate itself. Because of this gel-forming property, the gluten phosphates are useful as substitutes for the natural gums, as for example, gum tragacanth and gum acacia. Thus the gluten phosphates may be used as protective colloids in frozen fruit purees and ice cream, as stiffening or bodying agents in pie fillings such as custards and frozen fruit fillings, as emulsifying or carrying agents in pharmaceutical pastes, salves, ointments, as emulsifying or thickening agents in salad dressings, printing inks, and so forth.

It is to be emphasized that the gluten phosphates produced in accordance with this invention contain phosphate radicals in stable chemical combination with gluten. As a result solutions of these products can be made acid or alkaline and the phosphate radicals remain combined with the gluten. Thus these products are to be distinguished from materials produced by precipitating proteins from solution with phosphoric acid. Such materials do not possess a stable combination but are in the nature of ionic salts and the original protein can be obtained when the material is subjected to alkalis. Further, such ionic salts do not possess the gelling properties of the gluten phosphates herein disclosed.

Having thus described the invention, what is claimed is:

1. A process for preparing gluten phosphates which comprises forming a reaction mixture of gluten, urea, and phosphoric acid and heating this mixture to produce gluten phosphate.

2. A process for preparing gluten phosphates which comprises forming a reaction mixture of gluten, urea, and phosphoric acid and heating this mixture at an elevated temperature not over 150° C. to produce gluten phosphate.

3. A process for preparing gluten phosphate which comprises forming a mixture of gluten, urea, and phosphoric acid, said mixture containing from about 0.1 to about 0.4 part $H_3PO_4$ per part of gluten, and heating this mixture to produce gluten phosphate.

4. A process for preparing gluten phosphate which comprises forming a mixture of gluten, urea, and phosphoric acid, said mixture containing approximately 0.26 part $H_3PO_4$ per part of gluten, and heating this mixture to produce gluten phosphate.

5. A process for preparing gluten phosphate which comprises forming an aqueous reaction mixture of gluten, urea, and phosphoric acid, drying the reaction mixture, then heating it to produce gluten phosphate.

6. A process for preparing gluten phosphate which comprises forming an aqueous reaction mixture of gluten, urea, and phosphoric acid, drying the reaction mixture, then heating it to an elevated temperature not over about 150° C. to produce gluten phosphate.

7. A process for preparing gluten phosphate which comprises forming an aqueous reaction mixture of gluten, urea, and phosphoric acid, said mixture containing from about 0.1 to about 0.4 part $H_3PO_4$ per part gluten, drying the mixture then heating it to produce gluten phosphate.

8. A process for preparing gluten phosphate which comprises forming an aqueous reaction mixture of gluten, urea, and phosphoric acid, said mixture containing approximately 0.26 part $H_3PO_4$ per part of gluten, drying this mixture and heating it to produce gluten phosphate.

9. A process for preparing gluten phosphate which comprises forming an aqueous reaction mixture containing gluten, urea, and phosphoric acid, drying this mixture at a temperature not over about 60° C., then heating it to an elevated temperature not over about 150° C. to produce gluten phosphate.

10. A process for preparing gluten phosphate which comprises forming an aqueous reaction mixture of gluten, urea, and phosphoric acid, drying this mixture at a temperature of about 40° C., then heating it to about 140° C. to produce gluten phosphate.

11. A process for preparing gluten phosphate which comprises forming a reaction mixture of gluten, urea, and phosphoric acid, said mixture containing from about 0.1 to about 0.4 part $H_3PO_4$ per part of gluten, drying the mixture at about 40° C., then heating it at about 140° C. to produce gluten phosphate.

HAROLD S. OLCOTT.
ALI MOHAMMAD.

No references cited.